(12) United States Patent
Verin et al.

(10) Patent No.: US 11,974,343 B2
(45) Date of Patent: Apr. 30, 2024

(54) METHOD FOR SELECTIVELY CONNECTING MOBILE DEVICES TO 4G OR 5G NETWORKS AND NETWORK FEDERATION WHICH IMPLEMENTS SUCH METHOD

(71) Applicant: HEWLETT PACKARD ENTERPRISE DEVELOPMENT LP, Spring, TX (US)

(72) Inventors: Gianluca Verin, Pozzoleone (IT); Marcello Zin, Padua (IT)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/267,271

(22) PCT Filed: Dec. 16, 2021

(86) PCT No.: PCT/IB2021/061842
§ 371 (c)(1),
(2) Date: Jun. 14, 2023

(87) PCT Pub. No.: WO2022/130271
PCT Pub. Date: Jun. 23, 2022

(65) Prior Publication Data
US 2024/0049324 A1    Feb. 8, 2024

(30) Foreign Application Priority Data
Dec. 16, 2020   (IT) .................. 102020000031130

(51) Int. Cl.
*H04W 76/16*     (2018.01)
*H04W 88/06*     (2009.01)

(52) U.S. Cl.
CPC ........... *H04W 76/16* (2018.02); *H04W 88/06* (2013.01)

(58) Field of Classification Search
CPC .............................. H04W 76/16; H04W 88/06
See application file for complete search history.

(56) References Cited

U.S. PATENT DOCUMENTS

2009/0073994 A1    3/2009  Qureshi
2016/0219475 A1*   7/2016  Kim ...................... H04W 76/15
(Continued)

FOREIGN PATENT DOCUMENTS

EP    2282465    2/2011
EP    3142321    3/2017

*Primary Examiner* — Julio R Perez (57) ABSTRACT

A method of selectively connecting mobile devices to 4G and/or 5G networks includes preparing a plurality of isolated 4G and/or 5G networks configured to define a network federation and each having a Radio Access Network (RAN), a PDN Gateway node or a User Plane Function (UPF), and an application server; preparing a plurality of mobile devices; connecting the mobile devices to the networks to exchange data traffic with the application server via, at least, the RAN and the PDN Gateway or UPF node; preparing a connectivity network configured to selectively connect the networks to each other; selecting one reference PDN Gateway or UPF node associated with a network of the federation; and migrating the data traffic associated with all the mobile devices connected to the networks other than the reference network to the application server associated with the reference network that includes the previously selected PDN Gateway or UPF node.

15 Claims, 5 Drawing Sheets

(56) References Cited

U.S. PATENT DOCUMENTS

| | | | | |
|---|---|---|---|---|
| 2017/0156086 A1* | 6/2017 | Tomici | ................ | H04W 76/16 |
| 2017/0195930 A1* | 7/2017 | Tomici | ................ | H04W 12/08 |
| 2020/0383152 A1* | 12/2020 | Walia | ................ | H04W 76/12 |
| 2022/0167448 A1* | 5/2022 | Palle | ................ | H04W 36/0069 |
| 2023/0328618 A1* | 10/2023 | Selvaganapathy | .. | H04W 36/362 |
| | | | | 370/331 |

* cited by examiner

METHOD FOR SELECTIVELY CONNECTING MOBILE DEVICES TO 4G OR 5G NETWORKS AND NETWORK FEDERATION WHICH IMPLEMENTS SUCH METHOD

FIELD OF APPLICATION OF THE INVENTION

The present invention can be applied in the technical sector of telecommunication networks and apparatus, and concerns a method for the selective connection of mobile devices to a 4G or 5G networks.

Moreover, a further subject of the invention is a 4G or 5G network federation which implements the method above.

STATE OF THE ART

As is known, 4G or 5G networks represent the current generation of broadband cellular network technology designed to provide a faster data connection among digital mobile devices such as smartphones, tablets, computers, IoT equipment, etc.

More specifically, the 4G/5G standard improves the network performance through wider bandwidth, lower latency and very high integration of all the pieces of apparatus in comparison to the previous networks standard.

In short, the key feature of the current 4G and 5G networks is the ability to be more flexible and adaptable to connect of a large number of devices which need to exchange a high data traffic.

In the fields of application, all components of a 4G or 5G network, including applications, radio and core network are usually concentrated in a single apparatus, sometimes called Network-In-a-Box.

In particular, this apparatus integrates all the software and hardware components required by a mobile network in a single physical device that implements the core-network according to the 3GPP standard.

The Network-In-a-Box refers to a single physical apparatus used to provide connectivity to a plurality of mobile devices associated with a plurality of users.

A Network-In-a-Box is for example used to provide basic connectivity in an emergency scenario or to provide data connection among the mobile devices associated with first responders, e.g. during a rescue mission.

Users need to communicate with each other to coordinate the operations among sub-groups of the same unity. In addition, they may need to communicate with a central support station or with the headquarters for supervision requests.

This kind of networks is also called Tactical Networks (TN) and their main advantage is that they provide a private, secure and flexible data transfer among users (e.g. first responders) belonging to a specific team.

To do this, each user of the team has a personal mobile device which can exchange data with the tactical network.

In the field of telecommunication networks the expressions Network-In-a-Box and Tactical Networks are normally used as synonyms.

Typically, the reduced size and weight of a tactical network apparatus allow the latter to be placed into a backpack supplied to a soldier or officer.

The main 4G/5G components incorporated in the tactical network are: a Radio Access Network RAN and components of the 4G or 5G such as the Serving Gateway (SGVV), the PDN Gateway (PGVV) and an the Application Server (AP). The tactical network may also optionally include the MME, HSS and PCRF for autonomous operation in 4G and/or equivalent in 5G core network functions. Moreover, the Router for external connectivity may also be included.

The RAN includes all the technology that enables connection to the 4G and/or core network.

The function of the node S-GW is the routing and forwarding of the IP data packets between P-GW and RAN; according to the 3GPP standard this component represents the node which is closest to the radio system.

On the contrary, the P-GW is the node which is closest to the software applications or the Internet.

The main function of the P-GW is to connect the LTE network (and the user's device connected to such network) to the Application Server or other external packet data networks (PDNs).

The P-GW is thus able to assign an IP address to the mobile device associated with the user (i.e. a smartphone, a tablet, a laptop etc.) and route data traffic coming from this mobile device to the Application Server or to a different destination, depending on the request coming from the same device.

The equivalent 5G components of the S-GW and P-GW are the SMF and UPF, where the UPF is the component which routes the data packets within the 5G Core Network and connects the Radio and the Application server.

The expression "Application Server" used in this context is generic as it refers to any software application which can be used by a user via the mobile device.

Therefore, the Application server may change as a function of the requirements and it may refer to a single application (or a limited list of applications) or to the Internet web without limitations.

The 4G/5G network used to generate a tactical network associated with a specific user is substantially isolated from the 4G/5G network used to generate a tactical network associated with a different user.

However, communication between different users is an important requirement during a mission or in an emergency scenario, since establishing a connection to different Application Servers associated with different users is useful during a mission.

A network connection between the router of each tactical network may be provided for solving this problem, so that the application server part of the different tactical networks can communicate.

In particular, the network connection may be suited to connect the client application installed in each user's mobile device, if this kind of connection is enabled by the respective Application Server installed in the tactical network.

Such inter-application server communication requires data to be exchanged between the application client/server via the network; such data can refer to the current position of the other devices of the user, user's access control, etc.

The data traffic associated with this additional information can be very high and connectivity networks in general are not designed to support high elevated peaks in the data exchange which can ensure the fast convergence of the necessary communication flow.

The main drawback due to this configuration lies in that, during a connection between two or more application server/client, the status of the connectivity network (and also the conditions of the 4G/5G networks) can quickly deteriorate and become particularly unstable as the number of the connected application servers increases.

As a consequence, the connectivity among the user's devices would be frequently interrupted or affected by high latency.

Moreover, the connection among the user's devices strictly depends on the features of the Application Server but there is no universally accepted standard to align the connectivity function of this software toward a single solution.

Therefore, there are currently several heterogeneous and fragmented solutions on the market, each with different criticalities and inefficiencies.

For these reasons, the LTE tactical networks developed so far are not so flexible as the market required, being unable to provide efficient connectivity between the user's devices.

Document EP 3 142 321 relates to tactical networks and it deals with issue of mutual communication among terminals located in different networks; document EP 2 282 465 discloses similar solution of an edge gateway connecting plurality of tactical networks and document US 2009/073994 discloses the issue of the address selection and the routing for the gateways which connect each of a plurality of tactical networks via satellite backbone. However, these documents have the same drawbacks as those listed above.

Presentation of the Invention

The present invention aims to overcome the drawbacks cited above by providing an innovative method for the selective connection of the mobile devices to a 4G or 5G network.

More specifically, the main object of the present invention is to provide a method for the selective connection of mobile device to a 4G or 5G network which is suited to reduce the complexity of the network.

It is another object of the present invention to provide a method for the selective connection of mobile devices to a 4G or 5G network that is able to increase the efficiency and the stability of the data traffic exchanged among the devices.

It is a further object of the present invention to provide a method for the selective connection of mobile devices to a 4G or 5G network that is able to guarantee a high level of security in data communication among the devices.

It is another object of the present invention to provide a method for the selective connection of mobile devices to a 4G or 5G network wherein the plug and play step is completely automatic and transparent for the user.

It is a further object of the present invention to provide a method for the selective connection of mobile devices to a 4G or 5G network wherein the applications associated with the users can exchange data independently of the private cellular network to which they are connected.

It is further object of the present invention to provide a method for the selective connection of mobile devices to a 4G or 5G network wherein the applications associated with the users can exchange data independently of the application being used.

It is a further, yet not the last object of the present invention to provide a method for the selective connection of mobile devices to a 4G or 5G network that is able to connect/disconnect the devices to/from the network independently of the type of application server and application client associated with the user.

These objects, together with others that are highlighted in greater detail below, are achieved by a method for the selective connection of mobile devices in a 4G or 5G network of the type claimed in claim 1.

Other objects that are better described below are achieved by the method for the selective connection of mobile devices in a 4G or 5G network claimed in the dependent claims.

According to a further aspect of the present invention, the subject of the same includes a 4G or 5G network federation according to claim 12.

BRIEF DESCRIPTION OF THE DRAWINGS

The advantages and characteristics of the present invention are clearly illustrated in the following detailed description of a preferred but non-limiting embodiment of a method for selective plug and play control of mobile devices in a 4G or 5G network, with particular reference to the following drawings, wherein.

Figures from 2 to 8 are schematic views of the steps disclosed in the present method and applied to a 4G or 5G network federation.

DETAILED DESCRIPTION OF THE INVENTION

The present invention concerns a method for the selective connection of one or more mobile devices of a user to wireless 4G and/or 5G networks.

More specifically, the present method is particularly suited to be applied to a plurality of 4G and/or 5G private cellular networks (or p-networks), as will be explained below.

A tactical p-network according to the scope of this invention is an independent 4G and/or 5G network suited to provide connectivity to one or more users.

This type of network is used in an emergency scenario when standard networks are not available and users need to establish high-speed rate connectivity.

A group of p-networks disclosed in this patent application is composed of a number of independent and isolated 4G and/or 5G p-networks. In particular, each 4G and 5G p-network is able to provide connectivity to one or more users with no need to cooperate with other p-networks.

For this reason, each 4G and/or 5G p-network is isolated from the other p-networks and it can autonomously provide connectivity to users.

Users can move between p-networks and their connectivity will be provided by the 4G and/or 5G p-network to which they are connected at that specific moment in time.

4G and/or 5G p-networks are usually generated by a single apparatus designed to be worn by a user; for example, this apparatus may comprise a single case suited to be placed into a backpack supplied to the user.

The invention disclosed in this description refers to a method for selectively connecting one or more mobile devices associated with users to a 4G and/or 5G p-network. However, the same method may be applied to provide connectivity also between the mobile device associated with a general 4G and/or 5G network, which may not be a p-network.

Figure 1:
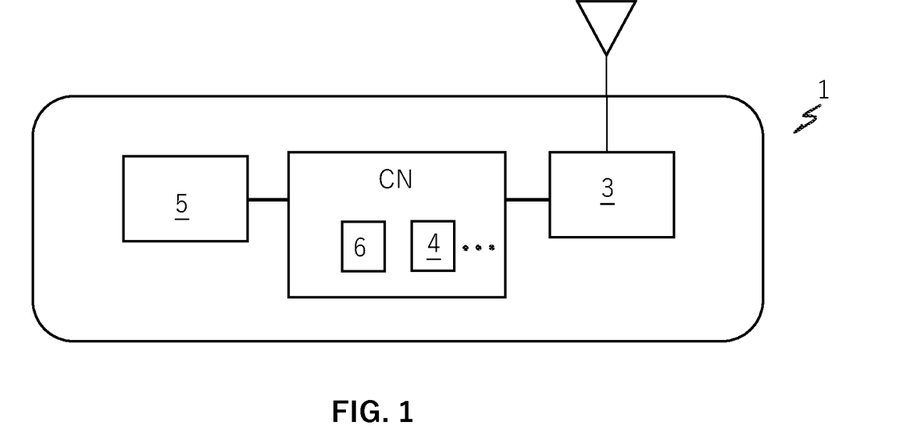
FIG. 1 is a schematic view of a private 4G or 5G cellular network constituted by core network and application server.
Figure 2:
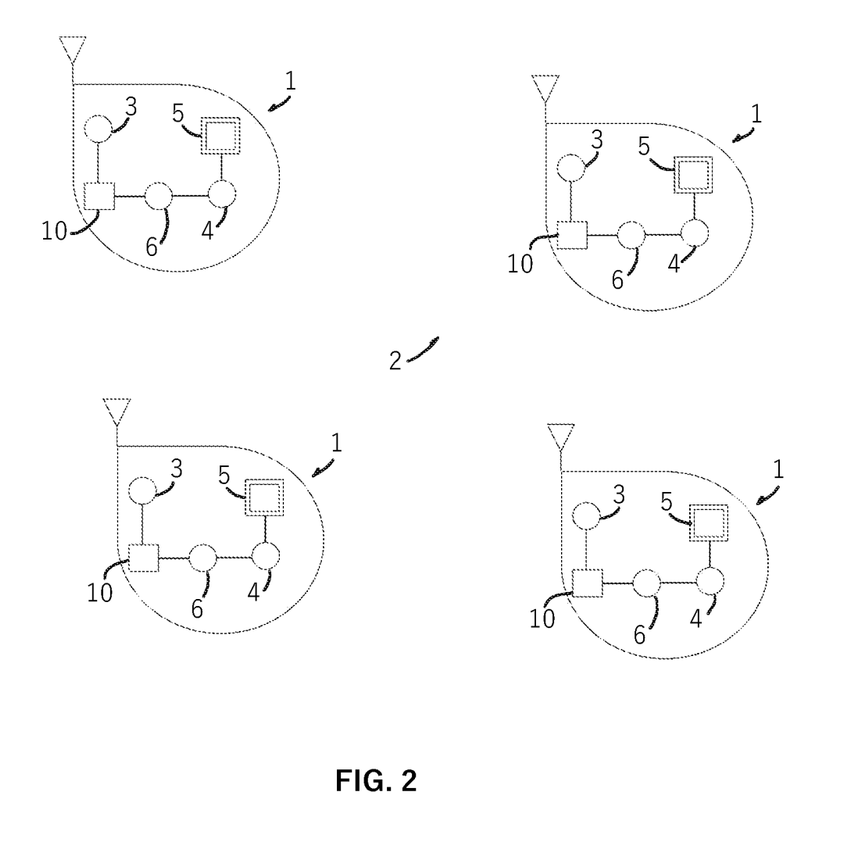

First, the present method includes a first step a) of preparation of a plurality of isolated 4G and/or 5G p-networks 1 suited to define a network group 2.

This condition is shown in FIG. 2.

The step a) makes it possible to provide a network group 2 formed by a number of isolated and independent 4G and/or 5G p-networks 1.

Each 4G and/or 5G private cellular network 1 includes at least the following components:
- a Radio Access Network 3;
- a 4G and/or 5G core network CN including, at least, a PDN gateway node 4 (in the case of a 4G network) or a UPF node (in the case of a 5G network);
- an application server 5.

All these layers are designed to comply the 3GPP standard.

The function of the Radio Access Network 3 is to provide wireless connectivity between the p-networks and the applications running in mobile devices.

This component includes all hardware/software technologies suited to provide radio access to the user's devices by transmission/reception of wireless signals.

In the present description the expressions "data packets" and "data traffic" have the same meaning, as they refer to a numerical data stream exchanged between two or more components of the 4G and/or 5G networks.

Within the 4G core network, the PDN gateway 4 (in the 4G core network) or the UPF node (in the 5G network) represent the node designed to connect the p-network to external networks or external services. Within the 5G core network, the PDN gateway function is served by the SMF (Session management function) and UPF (User plane function) for signalling and forwarding data traffic.

The function of the PDN gateway node 4 is to assign an IP address to each device connected to the 4G and/or 5G p-network and to forward data traffic between the latter and the external networks/services.

A PDN Gateway node 4 may forward data traffic to different external services as such internet services, voice services, etc.

The core network of a 4G p-network may also comprise a Serving gateway node which represents the local anchor point for the user's device and its main function is routing and forwarding data traffic. This node is typically located between a router and the PDN Gateway node. In a 5G network the Serving Gateway is replaced by a SMF node.

FIGS. 2-7 show the steps of the method according to the invention applied to a group/federation of 4G p-networks is used. In these Figures a PDN Network node 4 and a Serving Gateway or SMF node are schematically represented and the latter is assigned the reference number 6.

In addition, the 4G core network of the p-network 1 may comprise optional components such as MME node, HSS node or PCRF node, with the 5G equivalent nodes being AMF, AUSF, UDM, PCF, etc.

These optional components are typically used in Public Safety LTE-networks that require user access management with a high security level.

The application server 5 associated with the 4G and/or 5G p-network 1 is a generic expression used to refer to all types of software applications suited to exchange data traffic with a user's device.

The method comprises a step b) of preparation of a plurality of mobile devices 7 associated with one or more users and a step c) of connection of said devices 7 to the 4G and/or 5G networks 1.

In particular, each device 7 may be connected to a single 4G and/or 5G p-network but the same 4G and/or 5G p-network 1 may provide connectivity to more devices 7, associated with the same user or a different user.

Figure 3:
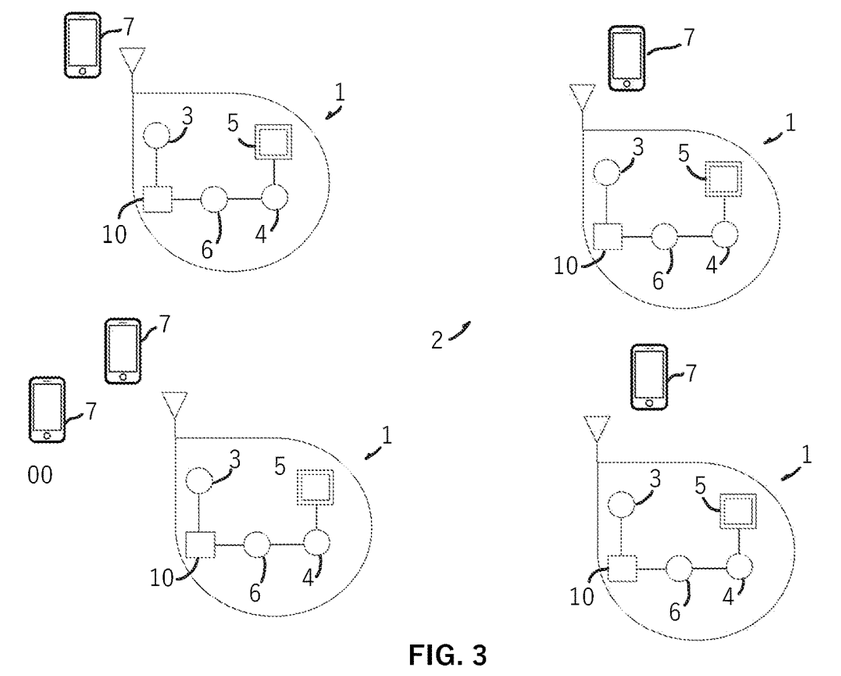

FIG. 3 shows the connection of a user's device 7 to a respective 4G and/or 5G p-network 1.

The device 7 is suited to exchange data traffic with the application server 5 associated with the same 4G and/or 5G p-network to which it is connected.

From the user's point of view, the 4G and 5G network 1 is a "wireless bubble" that allows data exchange between the mobile device/s 7 and the application server 5 and, where applicable, communication between applications associated on one or more user's device connected to the same application server of the same "wireless bubble".

The traffic between the mobile devices 7 and the application server 5 is forwarded via the Radio access Network 3, the Serving Gateway 6 or SMF node and the PDN Gateway node (or the UPF node) 4, (and vice versa).

Figure 4:
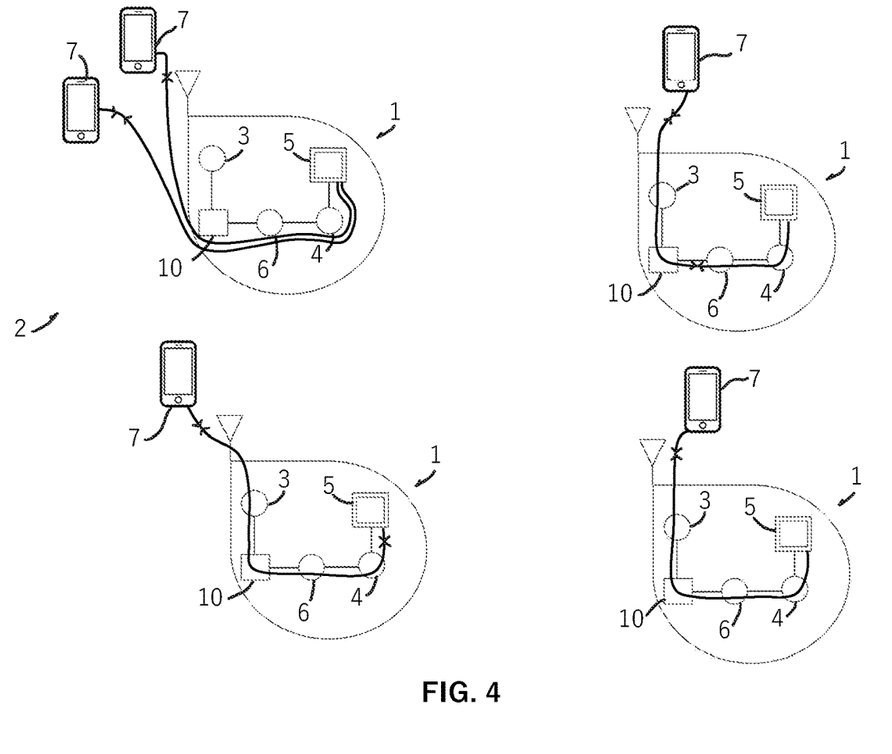

FIG. 4 shows a number of isolated 4G and/or 5G p-networks 1 wherein each device 7 (associated with a predetermined p-network 1) of the user is in communication with the application server 5 installed in the same network 1.

Figure 5:
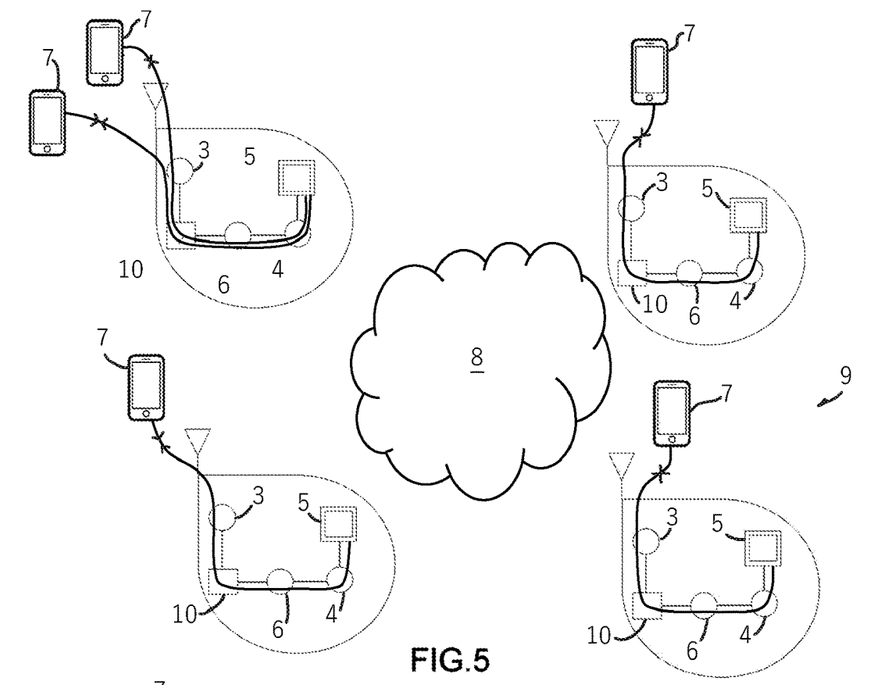

In order to provide connectivity between all isolated 4G and/or 5G p-networks 1, the method comprises a step d) of preparation and installation of a connectivity network 8.

In particular, this connectivity network 8 is able to connect all the 4G and/or 5G p-networks 1 to each other. A group of 4G or 5G p-networks mutually connected through a connectivity network defines a network federation.

This condition is shown in FIG. 5 where the network federation is indicated with the reference number 9.

The connectivity network 8 is selectively enabled/disabled depending on circumstances: the status "enabled" defines an active connectivity network 8 and all networks 1 are connected to each other via the latter. The status "disabled" defines an connectivity network 8 inactive and the 4G and/or 5G p-networks 1 of the federation 9 are substantially isolated from each other.

For the purpose of the present invention, the terms "disabled/deactivated/inactive" refer to the condition in which one or more 4G and/or 5G p-networks 1 of the federation 9 are unable to establish a connection with the connectivity network 8 (whether this condition is due to a complete deactivation of the network 8 or to the inability of 4G and/or 5G p-network 1 to establish a connection with the latter is irrelevant).

Figure 6:
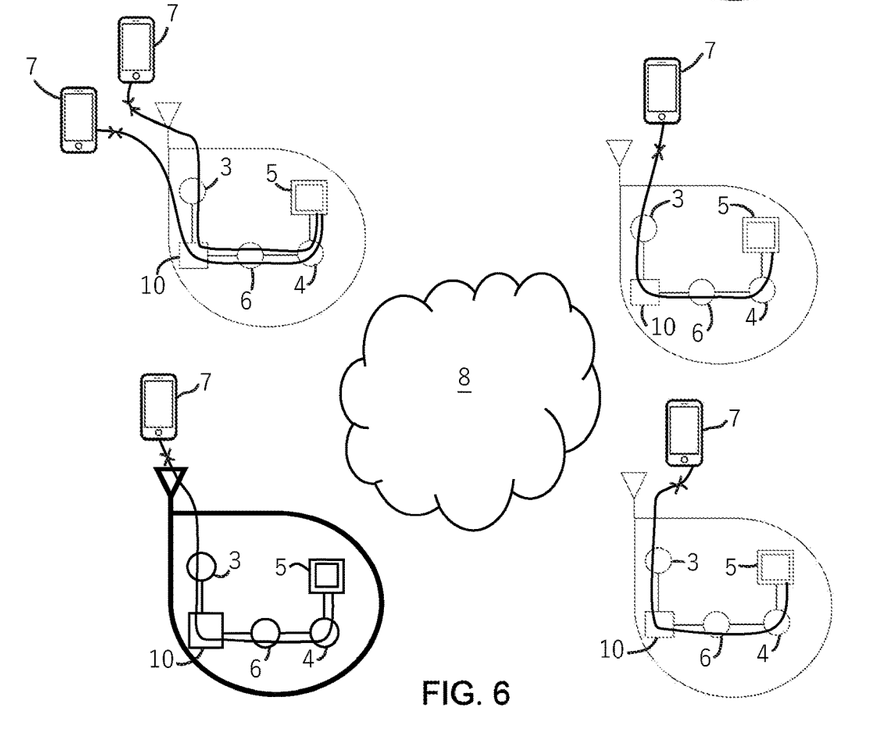

The method includes the step e) of selection of a PDN Gateway node (or of a UPF node) 4 associated with a corresponding 4G and/or 5G p-network 1 of the federation 9.

The selection carried out in the step e) makes it possible to elect a single PDN Gateway node (UPF node) 4 within the set of all PDN Gateway nodes (all UPF nodes) 5 associated with the networks 1 of the federation 9. For this reason, the PDN Gateway node (or UPF node) 4 selected during the step e) becomes the reference PDN Gateway node (or the reference UPF node) 4 (or the master PDN Gateway/UPF node) of the federation 9.

This condition is shown in FIG. 6.

The corresponding 4G and/or 5G p-network 1 associated with the PDN Gateway (or UPF node) 4 selected in the step e) becomes the reference 4G and/or 5G p-network 1 of the federation 9.

Figure 7:
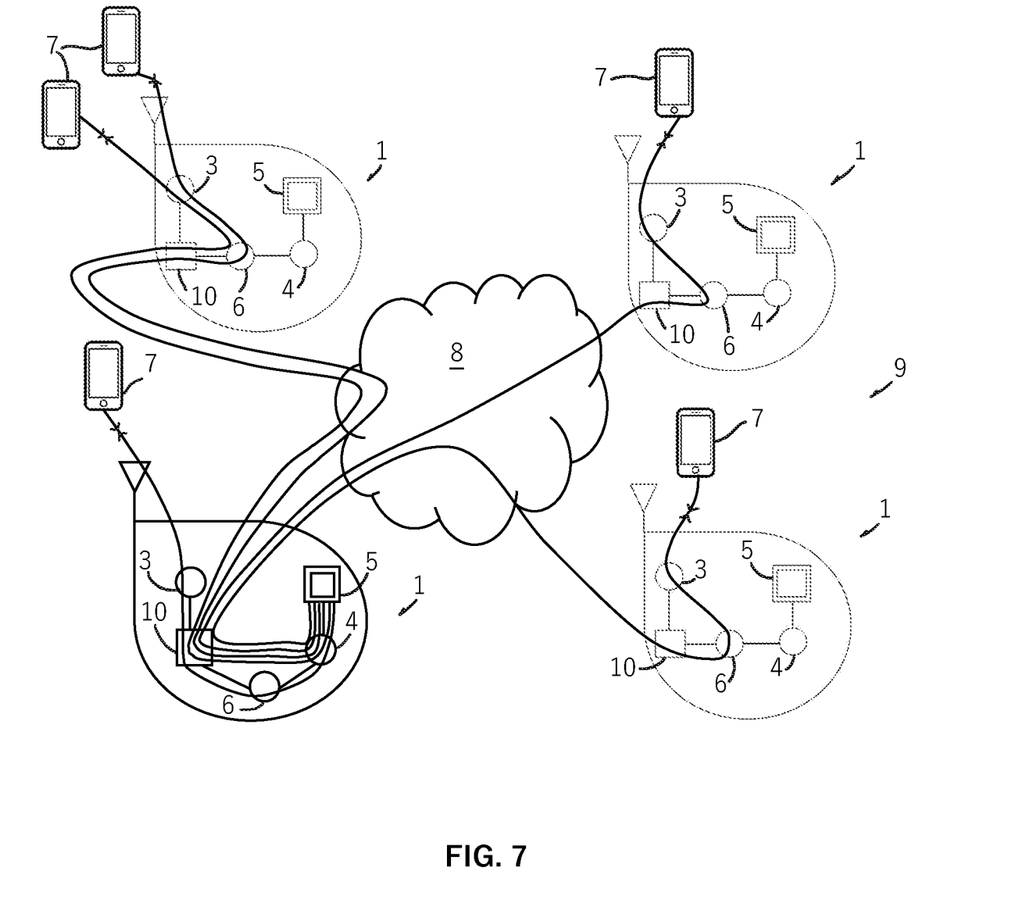

The method comprises a step f) of migration of the data traffic associated with all mobile devices 7 connected to the 4G and/or 5G p-networks 1 distinct and different from the reference network (or, in other words, the remaining p-networks other than the reference p-network) toward the application server 5 associated with the reference p-network which comprises the PDN Gateway node (or UPF node) 4 selected in the step e).

This condition is shown in FIG. 7.

In particular, all data traffic generated by the mobile devices 7 is forwarded to the application server 5 contained in the reference 4G and/or 5G p-network 1 via the connectivity network 8 and the reference PDN Gateway node (or the refence UPF node) 4.

The aim of step of migration f) is to connect all the user's devices 7 (associated with different 4G and/or 5G p-networks 1) to a single application server 5 associated with the reference 4G and/or 5G p-network 1.

In this manner, all data traffic coming from all mobile devices 7 is addressed to a single application server 5 which becomes the reference application server of the federation 9.

At the end of the step f) is it possible to identify a single reference 4G and/or 5G p-network 1 which includes a reference PDN Gateway node (or a reference UPF node) 4 and a reference application server 5.

In view of the above, all users may share data and information through a single application server 5 elected as a reference.

The selection of the reference PDN Gateway node (or UPF node) 4 represents a new and inventive way to provide connectivity to all devices 7 associated with isolated 4G and/or 5G p-networks 1 via a single application server 5 elected as a reference and installed in one of those p-networks 1.

It is important to note that the connectivity between the user's devices 7 provided by the present method is completely transparent to the features of the connectivity network 8 (or, in other words, completely independent of the features of the connectivity network 8).

The present method intends to provide a multi-user connectivity in a 4G and/or p-network federation exclusively based on a data traffic forwarding method whose steps are independent of the features associated with the components used in each 4G and/or 5G p-network federation or application server.

Preferably, the steps d)—f) are carried out every time a 4G and/or 5G network 1 is added to the federation 9 or every time a 4G and/or 5G p-network 1 abandons the latter.

A router 10 associated with a corresponding 4G and/or 5G p-network 1 of the federation may be arranged in the step a).

Each router 10 may be suited to forward data packets from a component of the p-network 1 to other components of the same p-network 1 (and vice-versa).

The router 10 may be operatively connected to the Radio Access Network 3 and to the Serving Gateway 6 or SMF node of the corresponding 4G and/or 5G p-network 1.

In addition, the router 10 may be operatively connected to the PDN Gateway (or UPF) node 4 and to a MME or AMF node (which are introduced in the next paragraph).

During the step a) a Mobility and Management Entity (MME) 11 node for a 4G network or an Access and Mobility Management Function (AMF) node for a 5G network may be provided to a 4G and/or 5G networks suited to define the network federation 9.

The method for selectively connecting mobile devices to 4G and/or 5G networks disclosed in the present application may be implemented in an alternative manner, as disclosed below.

Figure 8:
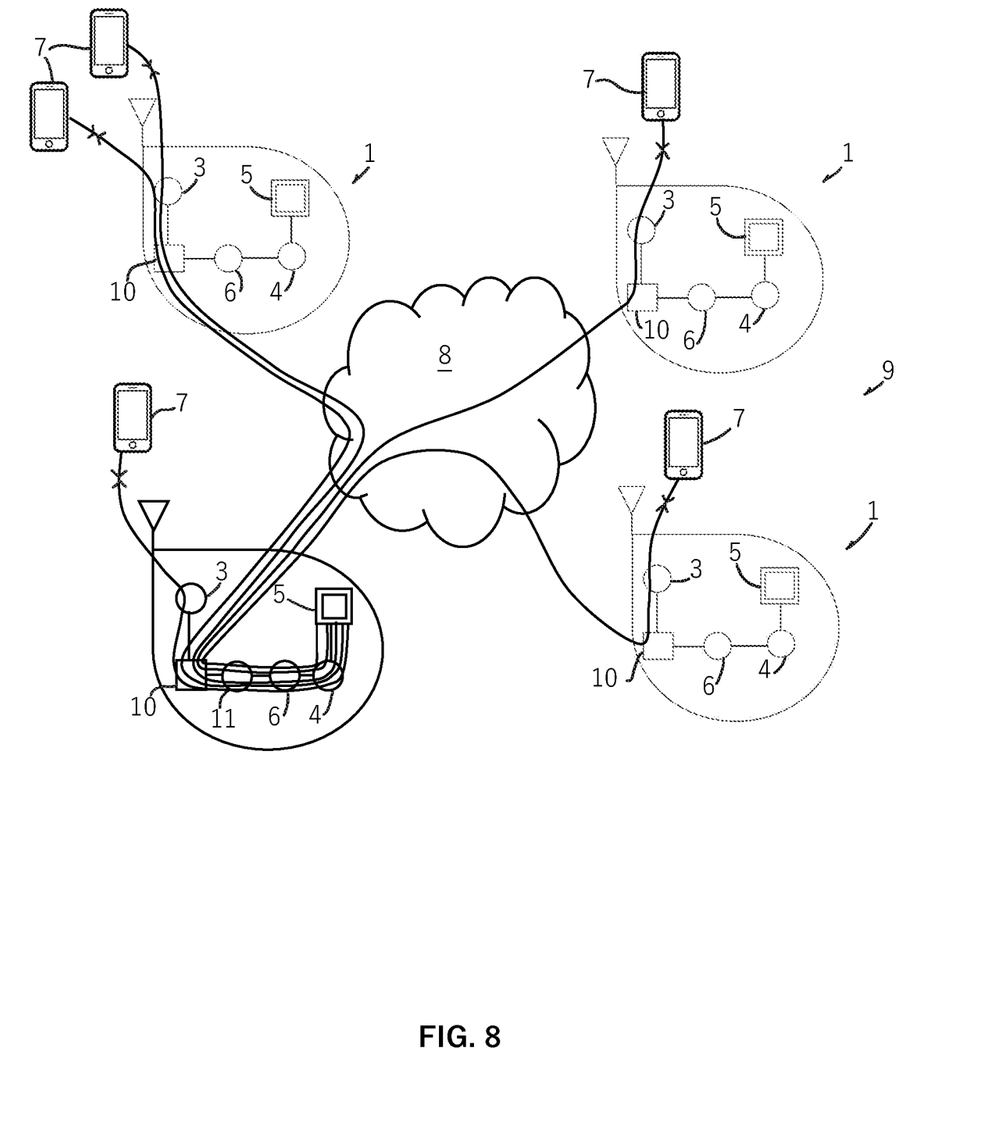

During execution of the migration step f) the data traffic may be forwarded from all the mobile devices 7 connected to the 4G and/or 5G network other than the reference network to the application server (5) associated with the reference 4G and/or 5G network selected in the step e) via a data path comprising the following nodes:
- the Radio Access Network 3 and the router 10 of the network to which the mobile device is connected
- the connectivity network 8 and
- the MME 11 or AMF node, the Serving Gateway 6 or SMF node, and the reference PDN Gateway node 4 or the UPF node each of them associated with the reference network 1.

In this method configuration, all data traffic is forwarded along a path that does not include the Serving Gateway 6 or SMF node of the networks to which the mobile devices are connected; the traffic travels directly from the Radio Access Network 3 to the Serving Gateway 6 or SMF node of the reference network via the connectivity network 8.

The traffic is first forwarded from the mobile device to the RAN node and from the latter to the router 10, then the router 10 forwards the traffic directly to the Serving Gateway 6 or SMF node of the reference network.

At the reference network, data traffic may reach the reference PDN Gateway node 4 after passing through the router 10, the RAN node 3 and the Serving Gateway 6 or SMF node.

This solution is shown in FIG. 8.

The method may also comprise a step g) of selection of a reference router 10 associated with the 4G and/or 5G p-network 1 which includes the reference P-GW node (or the UPF node) 4 and can create secure "data tunnels" across the connectivity network as appropriate.

In particular, the step g) of selection of a reference router 10 and the step e) of selection of the reference P-GW node (or UPF node) 4 are carried out substantially simultaneously since the selection of an elected P-GW node (or UPF node) 4 is a result obtained as a direct consequence of the election of a router 10. In addition, the step g) may be carried out only if the broadcast network 8 is active and in operation.

Typically, the steps g) and e) may be based on a standard protocol currently used for selecting a master router between a plurality.

The Open Shortest Path First protocol (OSPF) is the most common routing protocol used in the IP network and this protocol may be used also in the steps g) and e).

It is important to note that the OSPF protocol may be used only in case one or more routers 10 are defined in the step a). In fact, the step e) of election of a reference PDN Gateway node (or UPF node) 4 may be based on different algorithms if the core network defined in the step a) does not include a router.

However, other routing protocols different from the OSPF may be eventually used during execution of the step g) and the step e) provided that they are able to elect, respectively, a single router 10 between and the corresponding reference PDN Gateway (or a refence UPF network) 4.

Step g) makes it possible to define a reference router 10 associated with the reference 4G and/or 5G p-network 1 previously defined in the step e).

After step g), the method may comprise a step h) of assignment of a new Domain Name System (DNS) record associated with the routers 10 of one or more 4G and/or 5G networks 1 other than the reference network.

In particular, the new DNS record is associated with the reference router 10 selected in said step f).

In this way, after the step e) all data traffic is forwarded to the reference application server 5 via the connectivity network 8, the reference router 10 and the reference PDN Gateway (or reference UPF node) 4.

During the migration step f), data traffic upstream of the connectivity network 8 and generated by a user's mobile device 7 is forwarded via the Radio Access Network 3, the Serving Gateway 6 or SMF node and the router 10 associated with the network 1 to which the same device 7 is connected.

The term "upstream" refers to the path of data traffic before it reaches the connectivity network 8.

Moreover, during the step f) the data traffic downstream of the connectivity network 8 is forwarded to the reference application server 5 via the reference router 10 and the reference PDN Gateway node (or UPF node) 4 associated with the reference 4G and/or 5G p-network 1.

The term "downstream" refers to the path of data traffic from the connectivity network 8 to the application server 5.

The present method may comprise a further step i) of detection of the inactive sessions between the user's mobile devices 7 and the corresponding application server associated with the 4G and/or 5G p-network 1 to which said devices 7 are connected.

This detection step i) is carried out before the migration step f).

The step f) may also be carried out on the data traffic associated with the devices 7 detected in the step i).

In a further configuration of the method, a detection step l) suited to detect the deactivation of the connectivity network 8 may be provided.

The method may comprise a further step m) of forwarding the data traffic previously exchanged between the user's mobile device 7 and the reference PDN Gateway node (or reference UPF node) 4 to the application server 5 associated with the 4G and/or 5G p-network 1 to which the user's device 7 is connected.

The aim of the steps l) and m) is to force the return to a "reset configuration" of one or more 4G and/or 5G p-networks 1 of the federation 9 if the connectivity network 9 is inactive.

In this condition, the 4G and/or 5G p-network 1 is isolated from other p-networks and data traffic coming from the user's device 7 is forwarded to the application server 5 (of the same network) via the PDN Gateway node (or the UPF node) 4 (of the same network).

If the connectivity network 8 is inactive, the user's devices 7 only forward data traffic to the application server associated with the 4G and/or 5G p-network 1 to which they are connected.

It is important to note that the same behaviour will also affect one or more 4G and/or 5G p-networks 1 if a connection to the connectivity network 8 is not available.

In particular, through the step l) it is also possible to detect an interruption of the operation of the connectivity network 8 so that in the next step m) the data traffic coming from the user's device 7 is forced to be routed to the application server 5 installed in the corresponding 4G and/or 5G p-network 1.

According to another aspect of the invention, a network federation is provided.

The network federation comprises a plurality of apparatuses suited to generate corresponding 4G and/or 5G p-networks 1 and a plurality of user's mobile devices 7 designed to exchange data traffic with a corresponding 4G and/or 5G network 1.

The federation also comprises a connectivity network 8 designed to connect the 4G and/or 5G p-networks 1 to each other.

Each apparatus is designed to define the 4G and 5G core networks which comprise at least the following components:
a Radio Access Network module 3;
a PDN gateway node 4 (for 4G networks) or a UPF node (for 5G networks);
an application server 5.

Each apparatus of the network federation operates according to the method disclosed above in order to promote connectivity between one or more devices 7 and the application server 5 associated with a reference 4G and/or 5G p-network 1.

In particular, the data traffic coming from a user's device 7 may be forwarded to the reference application server 5 via the connectivity network 8 and the reference PDN gateway module (or reference UPF module) 4, at least.

In addition, one or more apparatuses may comprise a router 10 operatively connected to the Radio Access Network module 3 and to the Serving Gateway or SMF module 6.

In this case, the data traffic coming from a user's device 7 may be forwarded to the reference application server 5 via the connectivity network 8, the reference router 10 and the reference PDN Gateway module (or reference UPF module) 4.

Preferably, each apparatus can be designed to be worn by a user and define a private cellular 4G and/or 5G network.

It is important to note that the method disclosed above can also be successfully applied for technologies different from 4G and/or 5G private cellular networks; for example, the method can be applied to selectively connect one or more devices to a network based on WiFi or other wireless technologies.

This type of apparatus has reduced size and weight and is suited to be placed in a backpack supplied to a user (typically a soldier or officer).

The present invention can be carried out in other variants, all falling within the scope of the inventive characteristics claimed and described herein; these technical details can be replaced by different but technically equivalent elements and materials; the shapes and sizes of the invention can be any, provided that they are compatible with its intended use.

The reference numbers and signs included in the claims and in the description have the only purpose of making the text easier to understand and must not be considered as elements limiting the technical interpretation of the objects or processes they identify.

The invention claimed is:

1. A method for selectively connecting mobile devices to 4G and/or 5G networks, comprising the following steps:
    a) providing a plurality of isolated 4G and/or 5G networks (1) configured to define a network federation (9), each of said 4G and/or 5G networks (1) including at least the following components:
        a Radio Access Network (3);
        a PDN Gateway node (4) for a 4G network or a User Plane Function (UPF) node for a 5G network;
        an application server (5);
    b) providing a plurality of mobile devices (7);
    c) connecting said mobile devices (7) to said 4G and/or 5G networks (1) to exchange data traffic with the application server (5) via, at least, said Radio Access Network (3) and said PDN Gateway (4) or UPF node;
    d) providing a connectivity network (8) designed to selectively connect the 4G and/or 5G networks (1) to each other;
    e) selecting of a reference PDN Gateway (4) or UPF node associated with a 4G and/or 5G network (1) of the network federation (9), the 4G and 5G network (1) associated with the reference PDN Gateway (4) or UPF node being configured to become a reference 4G and/or 5G network with respect other 4G and/or 5G networks (1) of the network federation (9); and
    f) migrating the data traffic associated with all the mobile devices (7) connected to the 4G and/or 5G networks (1) other than the reference 4G and/or 5G network to the application server (5) associated with the reference 4G and/or 5G network (1) which includes the reference PDN Gateway (4) or UPF node selected in step e),
    wherein, in step f) the data traffic is forwarded, respectively, via the connectivity network (8) and the reference PDN Gateway (4) or UPF node.

2. The method as claimed in claim 1 wherein one or more of the 4G and/or 5G networks (1) prepared in step a) includes a Serving Gateway node (6) for a 4G network or a SFM node for a 5G network, and a router (10), said router (10) being operatively connected to the Radio Access Network (3) and to the Serving Gateway (6) or a SMF node of a same network (1).

3. The method as claimed in claim 1, further comprising, after step d) of providing a connectivity network (8), a step g) of selecting a reference router (10) associated with the reference 4G and/or 5G network (1) which includes the reference PDN Gateway (4) or UPF node.

4. The method as claimed in claim 3, further comprising, after said step g) of selecting the reference router (10), a step h) of assigning a new Domain Name System (DNS) record associated with routers (10) of one or more of the 4G and/or 5G networks (1) other than the reference network (1), the new DNS record being associated with the reference router (10) selected in said step g).

5. The method as claimed in claim 4, wherein in step f) the data traffic is forwarded via the connectivity network (8), the reference router (10) and the reference PDN Gateway (4) or UPF node.

6. The method as claimed in claim 3, wherein the step g) of selecting the reference router (10) is based on a standard protocol for selection of a designed router.

7. The method as claimed in claim 6, wherein the standard protocol is a OSPF protocol or any protocol/algorithm configured to select a reference router (10) and a reference PDN Gateway (4) or UPF node.

8. The method as claimed in claim 1, further comprising a step i) of detecting inactive sessions between one or more of the mobile devices (7) and the application server (5) associated with the 4G and/or 5G network (1) to which said mobile devices (7) are connected.

9. The method as claimed in claim 8, wherein step f) is configured to migrate the data traffic associated with one or more of the mobile devices (7) detected in the step i).

10. The method as claimed in claim 1, wherein steps e)-f) are carried out when a number of the 4G and/or 5G networks (1) provided in step a) changes.

11. The method as claimed in claim 2, wherein one or more of the 4G and/or 5G networks (1) provided in said step a) include a Mobility and Management Entity (MME) node (11) for a 4G network or an Access and Mobility Management Function (AMF) node for a 5G network.

12. The method as claimed in claim 11, wherein, in step f), the data traffic is forwarded from all of the mobile devices (7) connected to the 4G and/or 5G network other than the reference network to the application server (5) associated with the reference 4G and/or 5G network selected in step e) via, respectively, the Radio Access Network (3) and the router (10) of the 4G or 5G network with which the mobile devices are associated, the connectivity network (8), the MME or AMF node of the reference network and the reference PDN Gateway (4) or UPF node.

13. A network federation, comprising:
a plurality of apparatuses configured to generate corresponding 4G and/or 5G networks (1);
a plurality of mobile devices (7), each of said mobile devices (7) being designed to be connected to a corresponding 4G and/or 5G network (1) of the network federation (9);
a connectivity network (8) designed to connect the 4G and/or 5G networks (1) to each other;
wherein each apparatus comprises at least the following components:
a Radio Access Network module (3);
a PDN Gateway module (4) or a UTF module; and
an application server (5);
wherein the network federation comprises means configured to:
a) provide a plurality of mobile devices;
b) connect said mobile devices (7) to said 4G and/or 5G networks (1) to exchange data traffic with the application server (5) via, at least, said Radio Access Network (3) and said PDN Gateway (4) or UPF module;
c) provide a connectivity network (8) designed to selectively connect the 4G and/or 5G networks (1) to each other;
d) select one reference PDN Gateway (4) or UPF node associated with a 4G and/or network (1) of the network federation, the 4G and 5G network (1) associated with the reference PDN Gateway (4) or UPF node being adapted to become a reference network with respect other 4G and/or 5G networks (1) of the network federation; and
e) migrate the data traffic associated with all of the mobile devices (7) connected to the 4G and/or 5G networks (1) other than the reference network to the application server (5) associated with the reference network (1) which includes the selected PDN Gateway (4) or UPF node,
wherein the data traffic is forwarded via, respectively, the connectivity network (8) and the reference PDN Gateway (4) or UPF node.

14. The network federation as claimed in claim 13, wherein each apparatus comprises a router (10) and a Serving Gateway or SMF module (6), said router (1) being operatively connected to the Radio Access Network module (3) and to the Serving Gateway or SMF module (6).

15. The network federation as claimed in claim 14, wherein one or more of the mobile devices (7) are connected to the application server (5) associated with the reference 4G and/or 5G network (1) via the connectivity network (8), the router (10) and the reference PDN gateway (4) or UTF module associated with the reference 4G and/or 5G network (1).

* * * * *